United States Patent
Makino (10) Patent No.: US 6,810,745 B2
(45) Date of Patent: Nov. 2, 2004

(54) TEMPERATURE DEPENDENT SENSITIVITY COMPENSATION STRUCTURE OF SENSOR

(75) Inventor: Takanori Makino, Oogaki (JP)

(73) Assignee: Denso Corporation, Kariya (JP)

( * ) Notice: Subject to any disclaimer, the term of this patent is extended or adjusted under 35 U.S.C. 154(b) by 43 days.

(21) Appl. No.: 10/394,282

(22) Filed: Mar. 24, 2003

(65) Prior Publication Data

US 2003/0184327 A1 Oct. 2, 2003

(30) Foreign Application Priority Data

Mar. 29, 2002 (JP) ........................................ 2002-095521

(51) Int. Cl.[7] ............................................. G01L 19/04
(52) U.S. Cl. ................................................... 73/708
(58) Field of Search ................................ 73/700–756

(56) References Cited

U.S. PATENT DOCUMENTS

| | | | | |
|---|---|---|---|---|
| 3,967,188 A | * | 6/1976 | Spencer | 323/367 |
| 4,355,537 A | * | 10/1982 | vander Have | 73/708 |
| 4,813,272 A | | 3/1989 | Miyazaki et al. | |
| 5,197,334 A | * | 3/1993 | Guziak | 73/708 |
| 5,253,532 A | * | 10/1993 | Kamens | 73/708 |

FOREIGN PATENT DOCUMENTS

| | | | | |
|---|---|---|---|---|
| JP | 63-37673 | | 2/1988 | |
| JP | 1-110343 | | 7/1989 | |
| JP | 03002640 A | * | 1/1991 | G01L/9/00 |
| JP | 57044830 A | * | 3/1992 | G01L/9/00 |

* cited by examiner

*Primary Examiner*—Edward Lefkowitz
*Assistant Examiner*—Jermaine Jenkins
(74) *Attorney, Agent, or Firm*—Posz & Bethards, PLC (57) ABSTRACT

A temperature dependent sensitivity compensating circuit structure of a sensor is provided. The sensor includes a sensing element which has a TCS (Temperature Coefficient of Sensitivity). The circuit structure is designed to provide a temperature characteristic to current supplied to the sensing element, thereby compensating for a change in TCS of the sensing element.

10 Claims, 6 Drawing Sheets

TEMPERATURE DEPENDENT SENSITIVITY COMPENSATION STRUCTURE OF SENSOR

BACKGROUND OF THE INVENTION

1. Technical Field of the Invention

The present invention relates generally to a sensor which works to measure, for example, a physical pressure acting thereon, and more particularly to an improved temperature dependent sensitivity compensation structure of such a sensor designed to compensate for a change in sensitivity of the sensor arising from a change in temperature thereof.

2. Background Art

Figure 5:
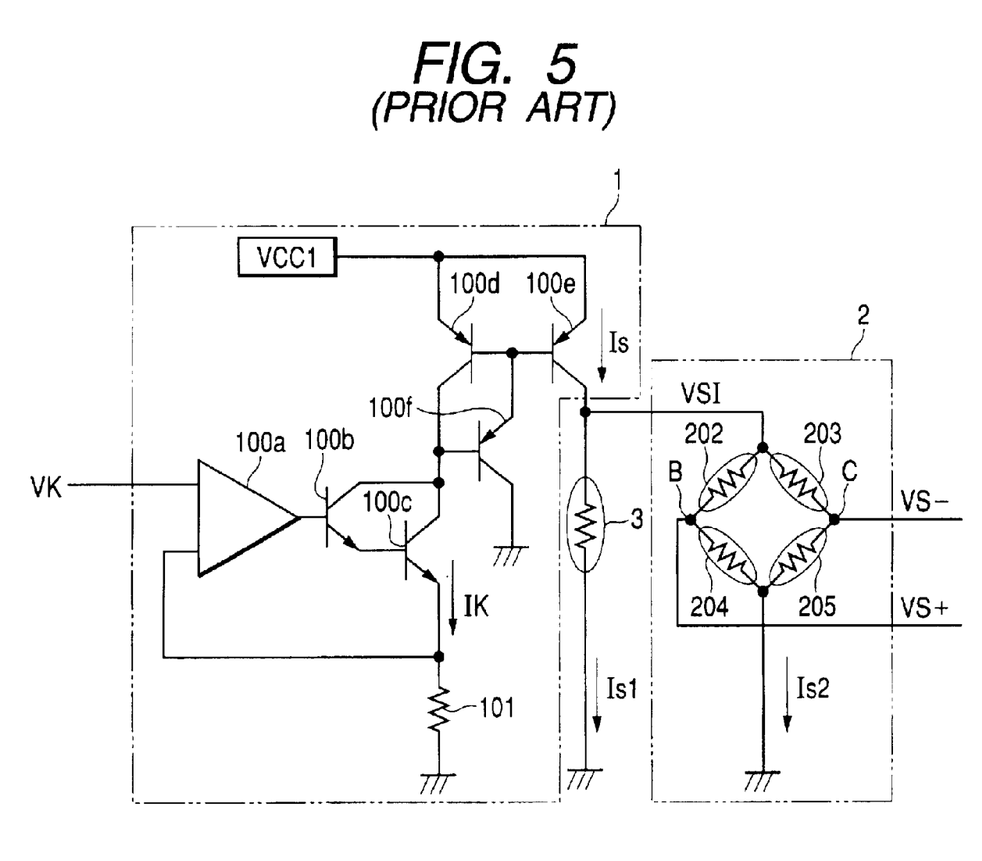
FIG. 5 is a circuit structure of a conventional pressure sensor.

Pressure sensors are known for use in measuring the pressure of brake fluid in a brake actuator or the pressure of fuel in a fuel injection device of automotive vehicles. Most of this type of pressure sensors includes a thin diaphragm formed on a semiconductor substrate and two pairs of gauge resistors connected on a central and a peripheral portion of the diaphragm in the form of a Wheatstone bridge to form a sensing element. When a physical pressure is exerted on the sensing element, it will cause the resistance of the gauge resistors to be changed by the piezoelectric effect, thereby resulting in a potential difference between middle points of the pairs of gauge resistors installed on the central and peripheral portions of the diaphragm. The pressure sensor amplifies and modifies such a voltage output to produce an electric signal as a function of the pressure applied thereto. In such a type of pressure sensor, the gauge resistors have a temperature coefficient of resistance (TCR) sensitive to a temperature change. Similarly, the sensing element has a temperature coefficient of sensitivity (TCS) sensitive to a temperature change. Therefore, pressure sensors designed to compensate for the TCS of the sensing element have been proposed. FIG. 5 shows an example of such a pressure sensor which will be described below.

The pressure sensor consists of a constant current circuit 1, a sensing element 2, and a temperature compensating resistor 3.

The constant current circuit 1 is made up of an operational amplifier 100a, Darlington-connected transistors 100b and 100c, current mirror-connected transistors 100d, 100e, and 100f, and a resistor 101. A voltage VK is inputted from an external to one of input terminals of the operational amplifier 100a. The other input terminal of the operational amplifier 100a is connected to an emitter of the transistor 100c. The operational amplifier 100a serves as a voltage follower which drives the current flowing through the transistor 100d through the transistors 100b and 100c. The constant current Is flows through the transistor 100e in proportion to the current flowing through the transistor 100d. In this way, the constant current Is flows through the transistor 100e in proportion to the input voltage VK. Note that the constant current Is is proportional only to the input voltage VK, but does not depend on the power supply voltage VCC1.

The sensing element 2 is made up of gauge resistors 202 to 205 connected in a form of the Wheatstone bridge. The gauge resistors 202 to 205 each have the TCR which is sensitive to the pressure applied to the sensing element 2 and the temperature of the sensing element 2. The voltage VSI of the transistor 100e of the constant current circuit 1 is applied to the sensing element 2. Voltages VS+ and VS− appear at joints B and C of the sensing element 2 as a function of the voltage VSI applied to the sensing element 2.

The temperature compensating resistor 3 has the TCR which is sensitive to the temperature thereof and is connected in parallel to the sensing element 2.

The TCR of the temperature compensating resistor 3 is greater than those of the gauge resistors 202 to 205. The current Is1 flowing through the temperature compensating resistor 3 decreases as the temperature rises, while the current Is2 flowing through the sensing element 2 increases as the temperature rises. The increase in current Is2 results in an increase in voltage VSI applied to the sensing element 2. The TCS of the sensing element 2 depends upon the voltage VSI, i.e., the current Is2 flowing through the sensing element 2.

Therefore, increasing the current Is2 serves to compensate for the TCS of the sensing element 2 if the TCS changes at a negative slope. Additionally, use of a resistor as the temperature compensating resistor 3 which has a TCR lower than that of the gauge resistors 202 to 205 enables the TCS of the sensing element 2 to be compensated for if it changes at a positive slope. In this case, the TCR of the temperature compensating resistor 3 may be smaller than those of the gauge resistors 202 to 205. For example, it may be zero (0). Specifically, the compensation of the TCS of the sensing element 2 is accomplished by providing a temperature characteristic to the current Is2 flowing through the sensing element 2 using the temperature compensating resistor 3 which has a temperature characteristic different from that of the gauge resistors 202 to 205 of the sensing element 2.

The TCR of the gauge resistors 202 to 205 of the sensing element 2, if implemented by diffused resistors, depends upon the concentration of impurities contained therein. A rise in temperature of the sensing element 2 during flow of constant current through the gauge resistors 202 to 205 results in a rise in voltage VSI applied to the sensing element 2. Specifically, the decrease in TCS is compensated for by the concentration of impurities in the diffused resistors, which is usually called sensitivity self-compensation, however, it is not always achieved. Accordingly, the pressure sensor further uses the temperature compensating resistor 3 having a given TCR for compensating for the TCS of the sensing element 2.

Figure 6A:
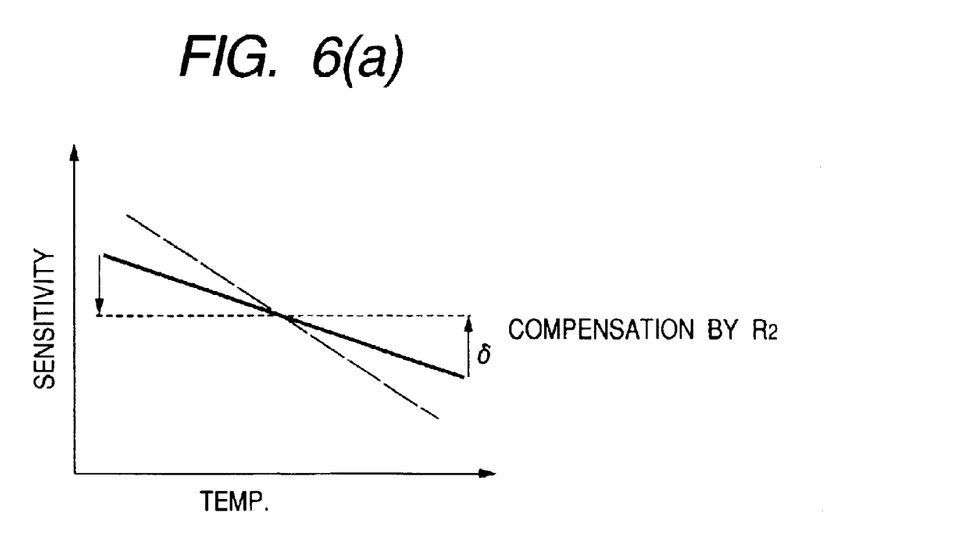
FIG. 6(a) is a graph which shows ideal sensitivity of a pressure sensor kept constant free from temperature of the pressure sensor.
Figure 6B:
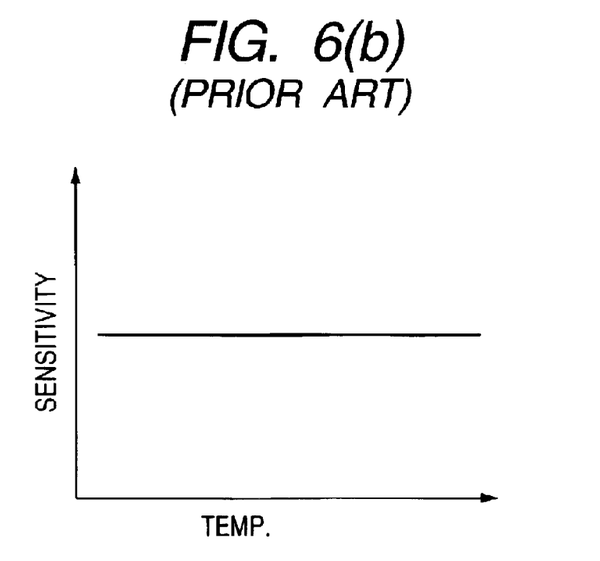
FIG. 6(b) is a graph which shows an actual sensitivity of the pressure sensor, as illustrated in FIG. 5, which is sensitive to temperature of the pressure sensor.

FIGS. 6(a) and 6(b) show an ideal TCS and an actual TCS of the pressure sensor, respectively. In a case of the ideal TCS of FIG. 6(a), the sensitivity of the sensing element 2 is kept constant by the sensitivity self-compensation free from the temperature thereof. In a case of the actual TCS of FIG. 6(b), the sensitivity changes, as indicated by a solid line, with a change in temperature of the pressure sensor. The pressure sensor of FIG. 5 uses the temperature compensating resistor 3 for compensating for the sensitivity by an amount δ.

However, the above pressure sensor encounters a difficulty in compensating for a change in the TCS completely if the TCS changes, as indicated by a chain line, at a greater slope.

SUMMARY OF THE INVENTION

It is therefore a principal object of the invention to avoid the disadvantages of the prior art.

It is another object of the invention to provide an improved circuit structure of a sensor designed to provide a temperature characteristic to current supplied to a sensing element, thereby compensating for a change in TCS of the sensing element.

According to one aspect of the invention, there is provided a sensor circuit which may be employed to measure a physical pressure acting thereon. The sensor circuit comprises: (a) a first resistor forming a sensing element; (b) a second resistor connected in parallel to the sensing element, the second resistor having a temperature characteristic different from that of the first resistor; (c) a current source supplying given currents to the first and second resistors; and (d) a compensating circuit installed in the current source. The compensating circuit works to provide temperature characteristics to the currents flowing through the first and second resistors, thereby compensating for any changes in TCS of the sensing element.

In the preferred mode of the invention, the current source may be designed to increase the currents flowing through the first and second resistors with a rise in temperature thereof. This enables compensation for a change in TCS when changing at a negative slop with a rise in temperature.

The current source may alternatively be designed to decrease the currents flowing through the first and second resistors with a rise in temperature thereof. This enables compensation for a change in TCS when changing a positive slop with a rise in temperature.

According to the second aspect of the invention, there is provided a sensor circuit which comprises: (a) a first resistor forming a sensor element; (b) a second resistor connected in parallel to the sensing element, the second resistor having a temperature characteristic different from that of the first resistor; (c) a current source supplying given currents to the first and second resistors; and (d) a third resistor installed in the current source. The third resistor has a resistance which changes as a function of a change in temperature thereof and works to provide temperature characteristics to the given currents flowing through the first and second resistors, thereby compensating for any changes in TCS of the sensing element.

In the preferred mode of the invention, the current source may be designed to increase the given currents flowing through the first and second resistors with a rise in temperature thereof. This enables compensation for a change in TCS when changing at a negative slop with a rise in temperature.

The current source may alternatively be designed to decrease the given currents flowing through the first and second resistors with a rise in temperature thereof. This enables compensation for a change in TCS when changing at a positive slop with a rise in temperature.

The current source has a first and a second transistor connected in the form of a current mirror. The current source produces a flow of a reference current through the first transistor to produce flows of a constant current proportional to the reference current from the second transistor to the first and second resistors as the currents flowing through the first and second resistors. The resistance of the third resistor increases with a rise in temperature thereof to increase the reference current.

The resistance of the third resistor may increase with a rise in temperature thereof to decrease the reference current, thereby enabling compensation for a change in TCS when changing at a positive slope with the rise in temperature.

The voltage inputted to one of input terminals of the operational amplifier may be changed by the resistance of the third resistor.

The current source may have an input voltage applied from an external to the other input terminal of the operational amplifier. The input voltage may be in proportional to the constant current.

The current source may have a first and a second transistor connected in the form of a current mirror, a fourth resistor connected in series with the first transistor, and an operational amplifier having two input terminals. An input voltage is applied to one of the input terminals of the operational amplifier. The voltage appearing at an end of the fourth resistor is applied to the other of the input terminals of the operational amplifier. An output of the operational amplifier serves to produce a flow of a reference current through the first transistor to produce flows of a constant current proportional to the reference current from the second transistor to the first and second resistors as the given currents flowing through the first and second resistors. The input voltage is applied to the other of the input terminals of the operational amplifier through the third resistor. The reference current is provided by a current flowing through the fourth resistor minus a current flowing through the third resistor. This enables compensation for a change in TCS when changing at a negative slop with a raise in temperature.

The current source may alternatively have a first and a second transistor connected in the form of a current mirror, a fourth resistor connected in series with the first transistor, and an operational amplifier having two input terminals. An input voltage is applied from an external to one of the input terminals of the operational amplifier. The voltage appearing at an end of the fourth resistor is applied to the other of the input terminals of the operational amplifier. An output of the operational amplifier serves to produce a flow of a reference current through the first transistor to produce flows of a constant current proportional to the reference current from the second transistor to the first and second resistors as the given currents flowing through the first and second resistors. The input voltage applied to the one of the input terminals of the operational amplifier is provided by a fraction of a power source voltage produced by a voltage divider using the third resistor. This enables compensation for a change in TCS when changing at a negative slop with a raise in temperature.

The current source may alternatively have a first and a second transistor connected in the form of a current mirror, a fourth resistor connected in series with the first transistor, and an operational amplifier having tow input terminals. An input voltage is applied from an external to one of the input terminals of the operational amplifier. An output of the operational amplifier serves to produce a flow of a reference current through the first transistor to produce flows of a constant current proportional to the reference current from the second transistor to the first and second resistors as the given currents flowing through the first and second resistors. A fraction of a voltage appearing at an end of the fourth resistor provided by the third resistor and a fifth resistor is applied to the other of the input terminals of the operational amplifier. This enables compensation for a change in TCS when changing at a negative slop with a raise in temperature.

According to the third aspect of the invention, there is provided a sensor circuit which comprises: (a) a first resistor forming a sensor element; (b) a second resistor connected in parallel to the sensing element, the second resistor having a temperature characteristic different from that of the first resistor; (c) a current source supplying given currents to the first and second resistors, the current source having a first and a second transistor connected in the form of a current mirror, a third resistor connected in series with the first transistor, and an operational amplifier having two input terminals, an input voltage being applied from an external to one of the input terminals of the operational amplifier, a voltage appearing at an end of the third resistor being applied to the other of the input terminals of the operational amplifier, an output of the operational amplifier serving to produce a flow of a reference current through the first transistor to produce flows of a constant current proportional to the reference current from the second transistor to the first and second resistors as the given currents flowing through the first and second resistors; and (d) a fourth resistor installed in the current source, the fourth resistor having a resistance which changes as a function of a change in temperature thereof and working to provide temperature characteristics to the given currents flowing through the first and second resistors. The input voltage is applied to the other of the input terminals of the operational amplifier through the fourth resistor. The reference current is provided by a current flowing through the third resistor minus a current flowing through the fourth resistor.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
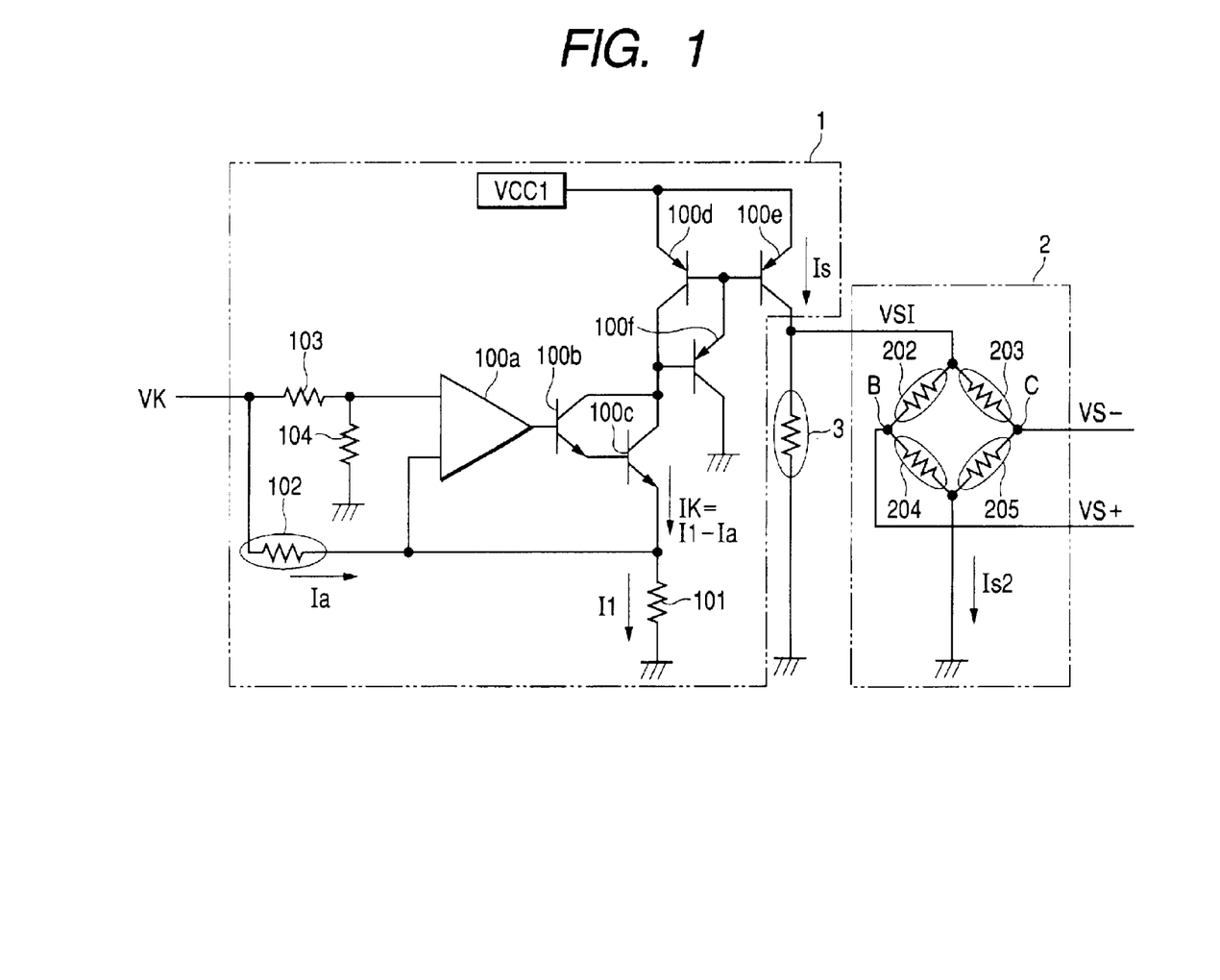
FIG. 1 is a circuit structure of a pressure sensor according to the first embodiment of the invention.

Referring to the drawings, wherein like reference numbers refer to like parts in several views, particularly to FIG. 1, there is shown a circuit structure of a pressure sensor according to the first embodiment of the invention. The same reference numbers as employed in FIG. 5 refer to the same parts. The pressure sensor of this embodiment is different only in structure of the constant current circuit 1 from the conventional structure as illustrated in FIG. 5, and explanation of the structure of the sensing element 1 in detail will be omitted here.

The constant current circuit 1 includes resistors 103 and 104 and a temperature compensating resistor 102 having a given temperature coefficient of resistance (TCR). The voltage VK is inputted to one of input terminals of an operational amplifier 100a through the resistor 103 and also to the other input terminal of the operational amplifier 100a through the resistor 102. The input terminal of the operational amplifier 100a leading to the resistor 103 is connected to ground through a resistor 104. Other arrangements are identical with those as illustrated in FIG. 5.

If currents flowing through the resistor 101 and the temperature compensating resistor 102 are defined as Il and Ia, respectively, the current Ik flowing through the transistor 100c Darlington-connected to the transistor 100d is expressed by Ik=Il−Ia. An increase in resistance of the resistor 102 with a rise in temperature thereof results in a decrease in current Ia flowing through the temperature compensating resistor 102 and an increase in current Ik flowing through the transistor 100c. The increase in current Ik results in an increase in constant current Is flowing through the transistor 100e, thereby causing the current Is2 flowing through the sensing element 2 to increase, which leads to an increase in voltage VSI applied to the sensing element 2. This enables compensation for a change in temperature coefficient of sensitivity (TCS) of the sensing element 2 because it depends upon the applied voltage VSI.

Specifically, if the sensitivity of the sensing element 2 changes greatly, as indicated by the chain line in FIG. 6(b), with a change in temperature thereof, the constant current circuit 1 of this embodiment works to compensate for a change in the TCS of the sensor element 2 completely through the temperature compensating resistor 102 with aid of the sensitivity self-compensation achieved by controlling the concentration of impurities contained in the resistors 202 to 205 and the temperature compensating resistor 102 having a given TCR, as already described in the introductory part of this application.

The resistors 103 and 104 are provided for establishing the same proportional relation between the input voltage VK and the constant current Is as that in the structure of FIG. 5. The constant current Is may also be changed by the temperature compensating resistor 102 without use of the resistors 103 and 104. Additionally, even if the temperature compensating resistor 3 is implemented by a resistor not having the TCR, changing the constant current Is may also be achieved by using the temperature compensating resistor 102.

The constant current Is is, like the conventional structure of FIG. 5, proportional only to the input voltage VK free from the power supply voltage VCC1. Thus, if the input voltage VK is provided in proportional to the power supply voltage VCC1, then a gauge output (i.e., VS+−VS−) will be proportional to the power supply voltage VCC1.

Figure 2:
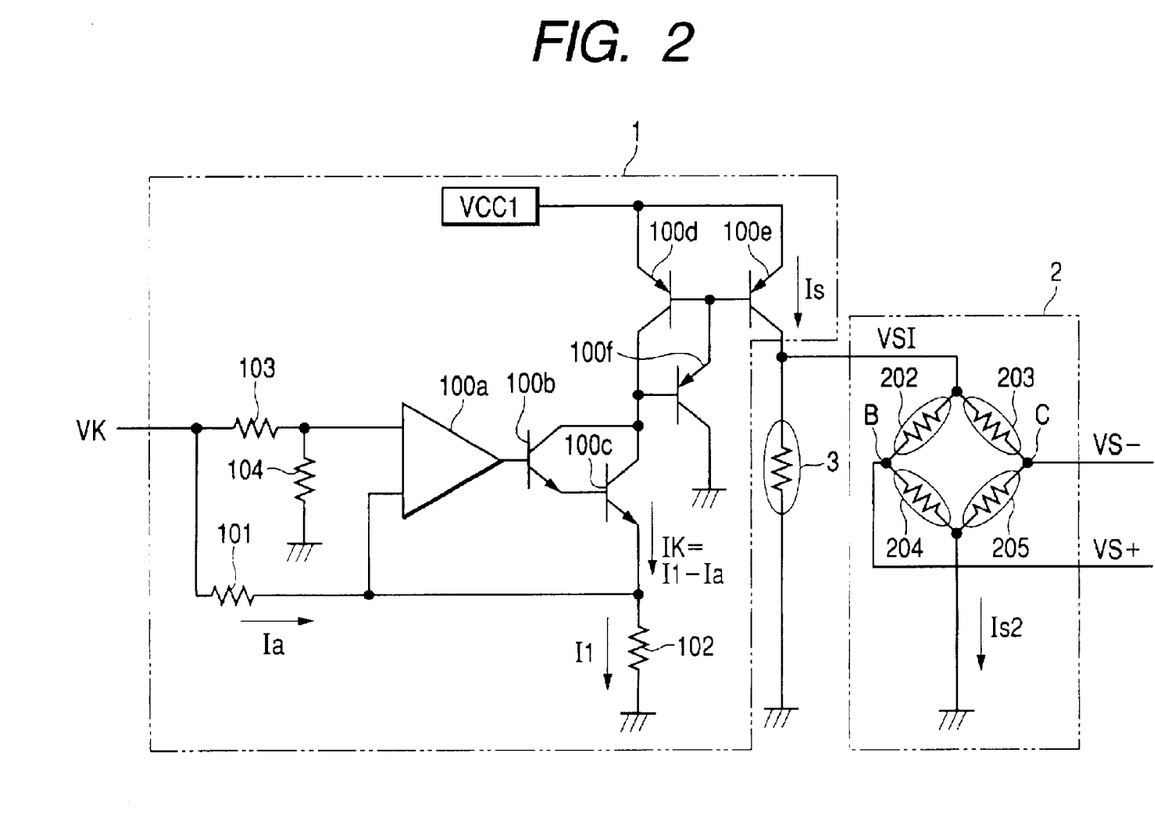
FIG. 2 is a circuit structure of a pressure sensor according to the second embodiment of the invention.

FIG. 2 shows a pressure sensor according to the second embodiment of the invention which is different from the first embodiment only in that the resistor 101 and the temperature compensating resistor 102 are exchanged.

Specifically, the resistor 101 is disposed between the end of the resistor 103 to which the voltage VK is inputted and one of the input terminals of the operational amplifier 100a. The temperature compensating resistor 102 is disposed between the transistor 100c and ground. Other arrangements are identical with those of the first embodiment, and explanation thereof in detail will be omitted here.

If currents flowing through the temperature compensating resistor 102 and the resistor 101 are defined as Il and Ia, respectively, the current Ik flowing through the transistor 100c is expressed by Ik=Il−Ia. An increase in resistance of the temperature compensating resistor 102 with a rise in temperature thereof results in decreases in current Il flowing through the temperature compensating resistor 102 and current Ik flowing through the transistor 100c. The decrease in current Ik results in a decrease in constant current Is flowing through the transistor 100e, thereby causing the current Is2 flowing through the sensing element 2 to decrease, which leads to a decrease in voltage VSI applied to the sensing element 2.

Specifically, a rise in temperature of the pressure sensor results in an increase in resistance of the temperature compensating resistor 102 having a given TCR, thereby decreasing the constant current Is flowing through the current mirror-connected transistor 100e, which compensates for a change in the TCS of the sensing element 2 in a case where the TCS changes at a positive slope with a change in temperature.

The constant current Is is, like the first embodiment, proportional only to the input voltage VK free from the power supply voltage VCC1.

Figure 3:
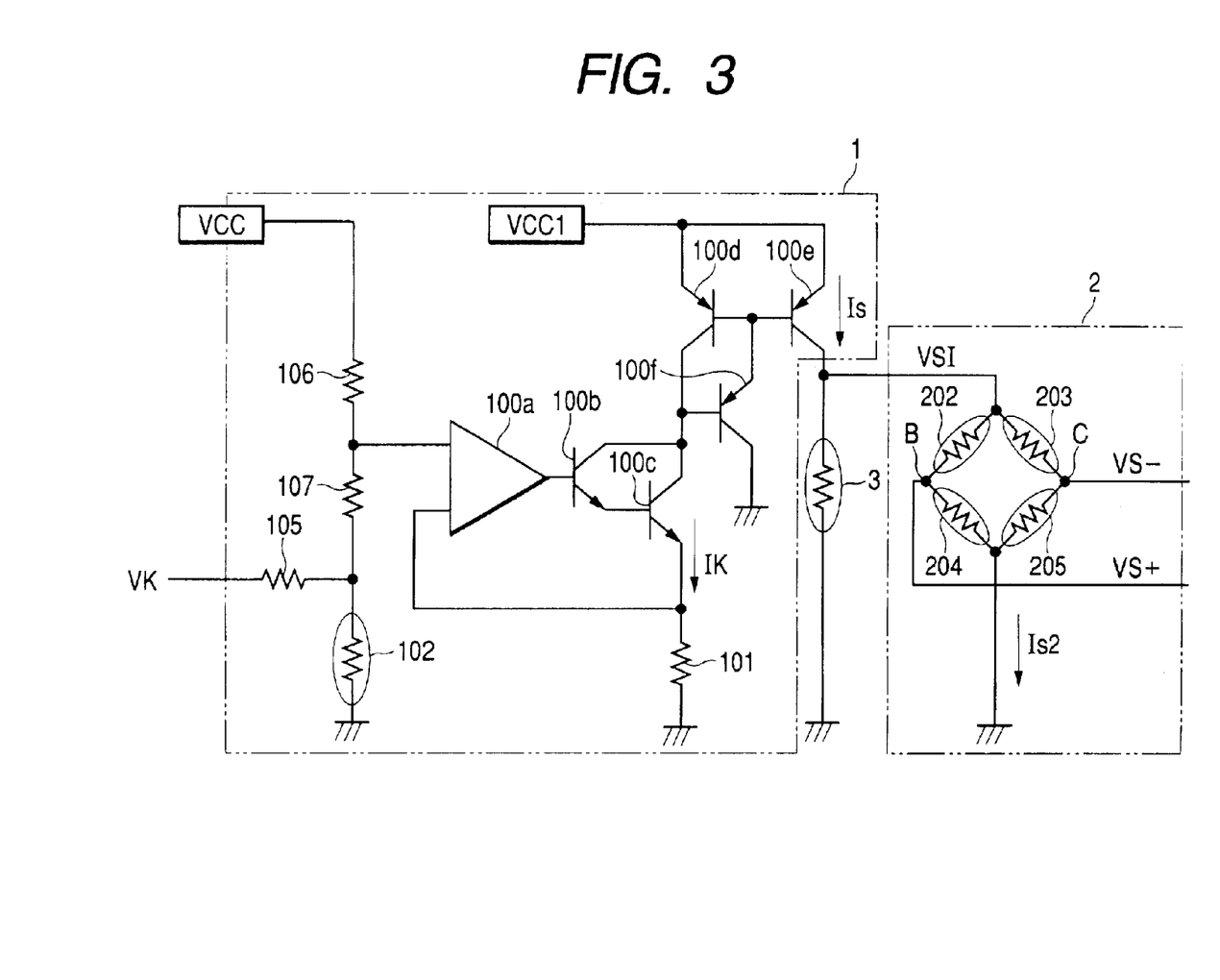
FIG. 3 is a circuit structure of a pressure sensor according to the third embodiment of the invention.

FIG. 3 shows a pressure sensor according to the third embodiment of the invention.

The constant current circuit 1 includes resistors 105 to 107 and the temperature compensating resistor 102 having the TCR. The resistors 106 and 107 and the temperature compensating resistor 102 serve to make fractions of a power source voltage VCC. An intermediate voltage developed between the resistors 106 and 107 is inputted to one of the input terminals of the comparator 100a. The input voltage VK is applied to a junction of the resistors 107 and 108 through the resistor 105. Other arrangements are identical with those of the first embodiment, and explanation thereof in detail will be omitted here.

In operation, an increase in resistance of the temperature compensating resistor 102 with a rise in temperature thereof results in an increase in intermediate voltage appearing at the junction between the resistors 106 and 107, so that the voltage appearing at the input terminal of the operational amplifier 100a rises. This causes the current Ik flowing through the transistor 100c to increase, thereby increasing the constant current Is flowing through the transistor 100e. The current Is2 flowing through the sensing element 2, thus, increases, so that the voltage VSI applied to the sensing element 2 increases.

Specifically, a rise in temperature of the pressure sensor results in an increase in resistance of the temperature compensating resistor 102 having a given TCR, thereby increasing the constant current Is flowing through the current mirror-connected transistor 100e, which compensates for a change in the TCS of the sensing element 2 in a case where the TCS changes at a negative slope with a change in temperature.

Figure 4:
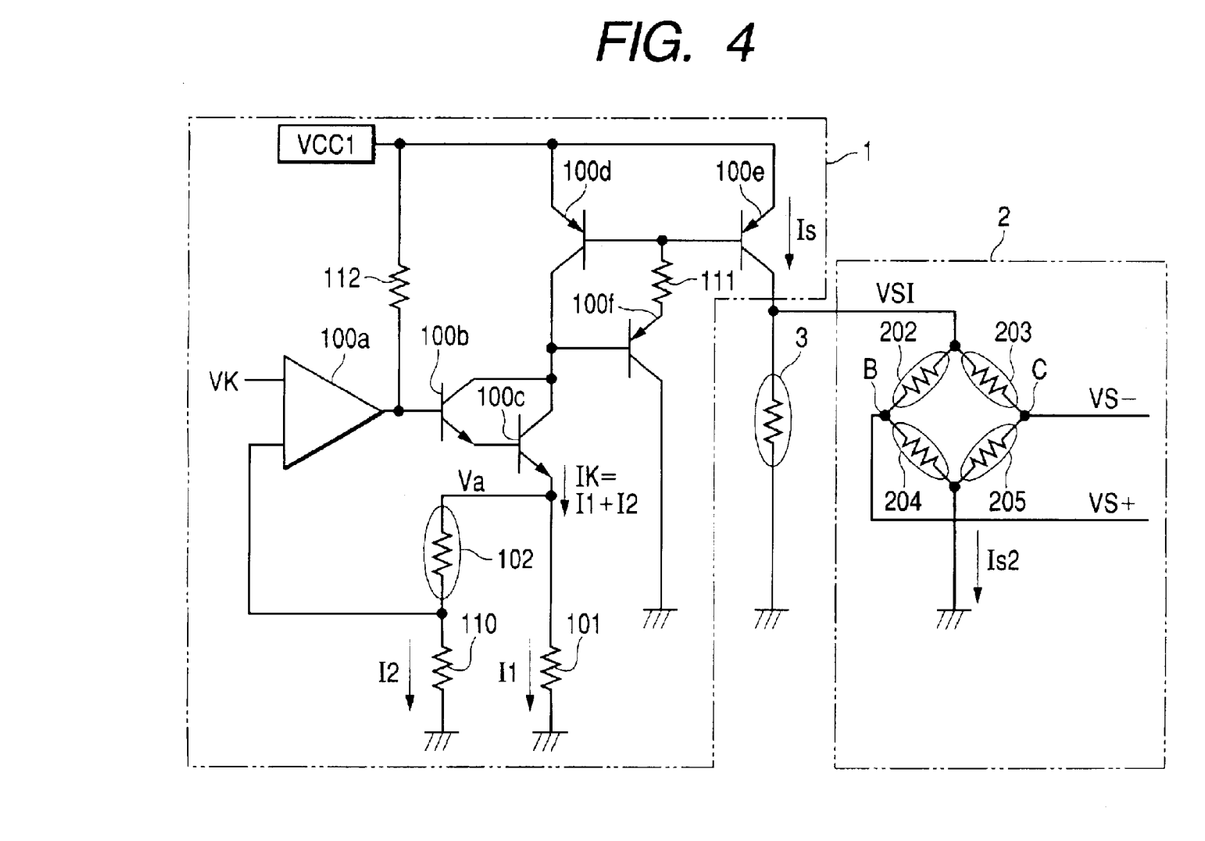
FIG. 4 is a circuit structure of a pressure sensor according to the fourth embodiment of the invention.

FIG. 4 shows a pressure sensor according to the fourth embodiment of the invention.

The constant current circuit 1 includes resistors 101, and 110 to 112 and the temperature compensating resistor 102 having the TCR. The operational amplifier is of an open collector type. The resistors 102 and 110 are connected in series and joined to the resistor 101 in parallel. The intermediate voltage appearing at a joint of the temperature compensating resistor 102 and the resistor 110 is inputted to one of the input terminals of the operational amplifier 100a. An output of the operational amplifier 100a is joined to the power supply VCC1 through the resistor 112.

The input voltage VK is identical with the intermediate voltage developed at the joint of the temperature compensating resistor 102 and the resistor 110 for characteristics of the operational amplifier 100a. If resistances of the resistors 101 and 110 and the temperature compensating resistor 102 are defined as R1, R2, and R3, respectively, the voltage Va appearing at the joint between the resistor 101 and the temperature compensating resistor 102 is given by the following relation.

$$Va = \{(R2+R3)/R2\} \times VK \qquad (1)$$

The currents I1 and I2 flowing through the resistors 101 and 110 are expressed as $$I1 = (1/R1) \times Va \qquad (2)$$

$$I2 = (1/R2) \times VK \qquad (3)$$

Thus, the current Ik flowing through the transistor 100c is $$Ik = \{(R1+R2+R3)/(R1 \times R2)\} \times VK \qquad (4)$$

If an amplification factor of current flowing through a current mirror made up of the transistors 100d and 100e is defined as n, the constant current Is flowing through the transistor 100e is expressed as $$Is = n \times \{(R1+R2+R3)/(R1 \times R2)\} \times VK \qquad (5)$$

As apparent from the above, an increase in resistance of the temperature compensating resistor 102 results in an increase in constant current Is flowing through the transistor 100e, thus causing the current flowing through the sensing element 2 to increase, leading to a rise in voltage VSI applied to the sensing element 2.

Specifically, a rise in temperature of the pressure sensor results in an increase in resistance of the temperature compensating resistor 102 having a given TCR, thereby increasing the constant current Is flowing through the current mirror-connected transistor 100e, which compensates for a change in the TCS of the sensing element 2 in a case where the TCS changes at a negative slope with a change in temperature.

The constant current Is is, like the first embodiment, proportional only to the input voltage VK free from the power supply voltage VCC1.

The operational amplifier 100a is, as described above, of an open collector type, thus resulting in an widened range of output voltage thereof, which increases a range within which the constant current Is flowing through the transistor 100e changes.

The above embodiments may also be used with physical quantity detectors other than pressure sensors which are equipped with a sensing element whose resistance changes as a function of a change in physical quantity such as acceleration or angular rate.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. A sensor circuit comprising:

a first resistor forming a sensing element;

a second resistor connected in parallel to said sensing element, said second resistor having a temperature characteristic different from that of said first resistor;

a current source supplying given currents to said first and second resistors and designed to one of increase and decrease the given currents flowing through said first and second resistors with a rise in temperature thereof; and a compensating circuit installed in said current source, said compensating circuit working to compensate for a change in temperature of said first resistor in cooperation with said second resistor, wherein said first resistor has a resistance value that is variable as a function of a physical quantity to be sensed by said sensing element.

2. A sensor circuit comprising:
a first resistor forming a sensor element;
a second resistor connected in parallel to said sensing element, said second resistor having a temperature characteristic different from that of said first resistor;
a current source supplying given currents to said first and second resistors and designed to one of increase and decrease the given currents flowing through said first and second resistors with a rise in temperature thereof; and
a third resistor installed in said current source, said third resistor having a resistance which changes as a function of a change in temperature thereof to compensate for a change in temperature of said first resistor in cooperation with said second resistor, wherein
said first resistor has a resistance value that is variable as a function of a physical quantity to be sensed by said sensing element.

3. A sensor circuit as set forth in claim 2, wherein said current source has a first and a second transistor connected in the form of a current mirror, said current source producing a flow of a reference current through said first transistor to produce flows of a constant current proportional to the reference current from said second transistor to said first and second resistors as the currents flowing through said first and second resistors, and wherein the resistance of said third resistor increases with a rise in temperature thereof to increase the reference current.

4. A sensor circuit as set forth in claim 2, wherein said current source has a first and a second transistor connected in the form of a current mirror, said current source producing flow of a reference current through said first transistor to produce flows of a constant current proportional to the reference current from said second transistor to said first and second resistors as the given currents flowing through said first and second resistors, and wherein the resistance of said third resistor increases with a rise in temperature thereof to decrease the reference current.

5. A sensor circuit as set forth in claim 2, wherein said current source has a first and a second transistor connected in the form of a current mirror, and an operational amplifier working to change a reference current flowing through said first transistor, said current source producing flows of a constant current proportional to the reference current from said second transistor to said first and second resistors as the given currents flowing through said first and second resistors, and wherein voltage inputted to one of input terminals of the operational amplifier is changed by the resistance of said third resistor.

6. A sensor circuit as set forth in claim 5, wherein said current source has an input voltage applied from an external to the other input terminal of said operational amplifier, the input voltage being in proportional to said constant current.

7. A sensor circuit as set forth in claim 2, wherein said current source has a first and a second transistor connected in the form of a current mirror, a fourth resistor connected in series with said first transistor, and an operational amplifier having two input terminals, an input voltage being applied to one of the input terminals of the operational amplifier, a voltage appearing at an end of the fourth resistor being applied to the other of the input terminals of the operational amplifier, an output of the operational amplifier serving to produce a flow of a reference current through said first transistor to produce flows of a constant current proportional to the reference current from said second transistor to said first and second resistors as said given currents flowing through said first and second resistors, said input voltage being applied to the other of the input terminals of the operational amplifier through said third resistor, and wherein said reference current is provided by a current flowing through said fourth resistor minus a current flowing through said third resistor.

8. A sensor circuit as set forth in claim 2, wherein said current source has a first and a second transistor connected in the form of a current mirror, a fourth resistor connected in series with said first transistor, and an operational amplifier having two input terminals, an input voltage being applied from an external to one of the input terminals of the operational amplifier, a voltage appearing at an end of the fourth resistor being applied to the other of the input terminals of the operational amplifier, an output of the operational amplifier serving to produce a flow of a reference current through said first transistor to produce flows of a constant current proportional to the reference current from said second transistor to said first and second resistors as said given currents flowing through said first and second resistors, and wherein the input voltage applied to the one of the input terminals of said operational amplifier is provided by a fraction of a power source voltage produced by a voltage divider using said third resistor.

9. A sensor circuit as set forth in claim 2, wherein said current source has a first and a second transistor connected in the form of a current mirror, a fourth resistor connected in series with said first transistor, and an operational amplifier having tow input terminals, an input voltage being applied from an external to one of the input terminals of the operational amplifier, an output of the operational amplifier serving to produce a flow of a reference current through said first transistor to produce flows of a constant current proportional to the reference current from said second transistor to said first and second resistors as said given currents flowing through said first and second resistors, and wherein a fraction of a voltage appearing at an end of the fourth resistor provided by said third resistor and a fifth resistor is applied to the other of the input terminals of said operational amplifier.

10. A sensor circuit comprising:
a first resistor forming a sensor element;
a second resistor connected in parallel to said sensing element, said second resistor having a temperature characteristic different from that of said first resistor;
a current source supplying given currents to said first and second resistors, said current source having a first and a second transistor connected in the form of a current mirror, a third resistor connected in series with said first transistor, and an operational amplifier having two input terminals, an input voltage being applied from an external to one of the input terminals of the operational amplifier, a voltage appearing at an end of the third resistor being applied to the other of the input terminals of the operational amplifier, an output of the operational amplifier serving to produce a flow of a reference current through said first transistor to produce flows of a constant current proportional to the reference current from said second transistor to said first and second resistors as said given currents flowing through said first and second resistors; and
a fourth resistor installed in said current source, said fourth resistor having a resistance which changes as a function of a change in temperature thereof to one of increase and decrease the given currents with a rise in temperature thereof,
wherein said input voltage is applied to the other of the input terminals of the operational amplifier through said fourth resistor, and said reference current is provided by a current flowing through said third resistor minus a current flowing through said fourth resistor.

* * * * *